United States Patent
Wynn et al.

(10) Patent No.: US 6,457,107 B1
(45) Date of Patent: Sep. 24, 2002

(54) METHOD AND APPARATUS FOR REDUCING FALSE SHARING IN A DISTRIBUTED COMPUTING ENVIRONMENT

(75) Inventors: Allen Chester Wynn; Bruce A. Beadle, both of Round Rock; Michael Wayne Brown, Georgetown; Cristi Nesbitt Ullmann, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,514

(22) Filed: Feb. 28, 2000

(51) Int. Cl.[7] .............................................. G06F 12/14
(52) U.S. Cl. ..................... 711/152; 711/148; 711/147; 711/153; 711/163
(58) Field of Search .................... 711/130, 141–146, 711/147, 148, 152, 163, 153

(56) References Cited

U.S. PATENT DOCUMENTS

| | | |
|---|---|---|
| 5,313,578 A | 5/1994 | Christopher ................ 709/200 |
| 5,440,710 A | 8/1995 | Richter et al. ............... 711/207 |
| 5,598,553 A | 1/1997 | Richter et al. ............... 711/209 |
| 5,758,183 A | 5/1998 | Scales et al. .................... 710/5 |
| 5,761,729 A | 6/1998 | Scales et al. ................ 711/148 |
| 5,787,480 A | 7/1998 | Scales et al. ................ 711/148 |
| 5,822,763 A | 10/1998 | Baylor et al. ............... 711/141 |
| 5,933,598 A | 8/1999 | Scales et al. ................ 711/148 |
| 5,946,716 A | 8/1999 | Karp et al. .................. 711/207 |
| 5,950,228 A | 9/1999 | Scales et al. ................ 711/148 |
| 5,960,461 A * | 9/1999 | Frank et al. ................. 711/163 |
| 6,088,758 A * | 7/2000 | Kaufman et al. ........... 711/100 |
| 6,330,649 B1 * | 12/2001 | Frank et al. ................. 711/163 |

* cited by examiner

Primary Examiner—Than Nguyen
(74) Attorney, Agent, or Firm—Marilyn Smith Dawkins; Bracewell & Patterson, L.L.P.

(57) ABSTRACT

A method, system, and computer program product for reducing false sharing in a distributed computing environment, and in particular to a multi-processor data processing system. A method is proposed to define a virtual address range, within the system memory available to the processors, which will have a finer granularity than the default page size. These smaller sections, called "sub-pages," allow more efficient memory management. For example, a 64 Kilobyte range may be defined to have a 512 byte granularity rather than 4 Kilobytes, with each 512-byte sub-page capable of being separately managed.

28 Claims, 3 Drawing Sheets

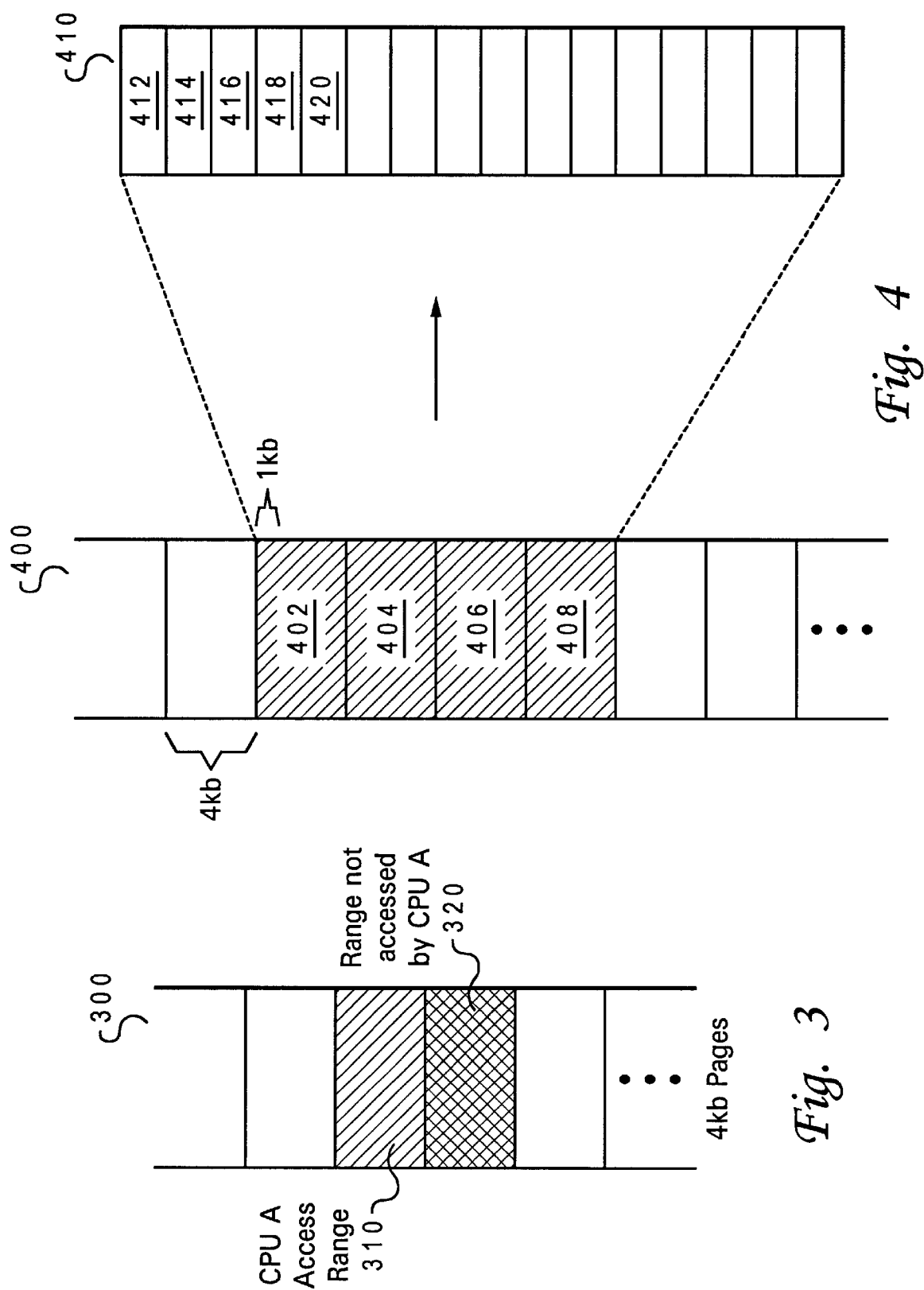

METHOD AND APPARATUS FOR REDUCING FALSE SHARING IN A DISTRIBUTED COMPUTING ENVIRONMENT

BACKGROUND OF THE INVENTION

1. Technical Field

The present invention generally relates to improved distributed computing systems and in particular to improved memory management in distributed computing systems. Still more particularly, the present invention relates to a method, system, and program product for improving memory page sharing in a distributed computing environment.

2. Description of the Related Art

Multiprocessor computer systems are well known in the art, and provide for increased processing capability by allowing processing tasks to be divided among several different system processors. In conventional systems, each processor is able to access all of the system resources; i.e., all of the system resources, such as memory and I/O devices, are shared between all of the system processors. Typically, some parts of a system resource may be partitioned between processors, e.g., while each processor will be able to access a shared memory, this memory is divided such that each processor has its own workspace.

More recently, symmetric multiprocessor (SMP) systems have been partitioned to behave as multiple independent computer systems. For example, a single system having eight processors might be configured to treat each of the eight processors (or multiple groups of one or more processors) as a separate system for processing purposes. Each of these "virtual" systems would have its own copy of the operating system, and may then be independently assigned tasks, or may operate together as a processing cluster, which provides for both high-speed processing and improved reliability. Typically, in a multiprocessor system, there is also a "service" processor, which manages the startup and operation of the overall system, including system configuration and data routing on shared buses and devices, to and from specific processors.

Typically, when an SMP system is divided into multiple virtual systems, each of the virtual systems has its own copy of the operating system, and the same operating system is used for each virtual system. Since each processor is running the same operating system, it is relatively easy to provide for resource allocation among the processors.

The name "multiprocessor" is used to connote a parallel computer with a "shared common memory"; the name "multicomputer" is used to connote a parallel computer with an "unshared distributed memories" or NO Remote Memory Access (NORMA).

Shared memory multiprocessors (often termed as "tightly coupled computers") are further classified into three categories: UMA, NUMA, and COMA. UMA machines feature "Uniform Memory Access", which implies that the latency for a memory access is uniform for all processors. Alternately, NUMA machines feature "Non-Uniform Memory Access", which implies that the latency for a memory access depends on the identity of the "location" of the processor and memory. Notice that a portion of the global shared memory of a NUMA machine may be uniformly accessible (i.e. part of a NUMA may be UMA). There are several memory organizations possible for NUMA machines. The most common is a distributed global memory, in which each processor maintains locally a "piece" of that memory. Access to the "local memory" is quite fast whereas access to "remote memory" (maintained by some other processor) is much slower (typically 2 orders of magnitude slower), as it requires navigation through a communication network of some sort. In addition to local memory, a NUMA machine may have a cache memory. If the collective size of the local cache memory of all processors is big enough, it may be possible to dispense with main memory altogether. This results in a COMA (Cache-Only Memory Access) machine (a.k.a. ALLCACHE machines).

UMA/NUMA/COMA multiprocessor machines are further classified as being either symmetric or asymmetric. A symmetric multiprocessor gives all processors "equal access" to the devices (e.g. disks, I/O) in the system; an asymmetric multiprocessor does not. In a symmetric system, executive programs (e.g. OS kernel) may be invoked on any processor.

Non-uniform memory access (NUMA) is a method of configuring a cluster of microprocessors in a multiprocessing system so that they can share memory locally, improving performance and the ability of the system to be expanded. NUMA is used in a symmetric multiprocessing (SMP) system. Ordinarily, a limitation of SMP is that as microprocessors are added, the shared bus or data path get overloaded and becomes a performance bottleneck. NUMA adds an intermediate level of memory shared among a few microprocessors so that all data accesses don't have to travel on the main bus. To an application program running in an SMP system, all the individual processor memories look like a single memory.

There are two outstanding problems with Non-Uniform Memory Access (NUMA) computers, latency and coherency. Both of these problems are magnified when false sharing occurs.

In a distributed computing environment, including multiprocessor computers, each CPU has its own physical memory and cannot directly see the physical memory of another CPU. The virtual address space, or virtual memory, of the distributed environment is distributed across the physical memory of the CPUs which are participating in the environment. A CPU can claim ownership of an address range (typically the machine page size, such as 4 Kilobytes), which we will call a "page", and that portion of the virtual address range is sent to that CPU for storage in it's physical memory. Thus, only one CPU can view the contents of a particular page of physical memory at any time.

For example, if the requesting CPU only needs to access the first 512 bytes of a 4 Kilobyte page it must still retrieve and claim ownership of the entire 4 Kilobyte page.

This introduces the problem of "False Sharing", wherein multiple processors each require access to the same block simultaneously, even if they actually access unrelated parts of that block. In this example, the CPU has claimed 4 Kilobytes of storage when it only needs access to 512 bytes. False sharing leads to reduced cache utilization, increased network traffic, and delays while waiting for data to be retrieved.

If the page being shared is frequently used, thrashing can occur and performance will suffer. Thrashing is a behavior characterized by the extensive exchange of data between processors competing for the same data block, which occurs so frequently that it becomes the predominant activity. This will considerably slow down all useful processing in the system. It would therefore be desirable to provide a software-based memory management system which reduces thrashing and false sharing.

SUMMARY OF THE INVENTION

It is therefore one object of the present invention to provide improved distributed computing systems.

It is another object of the present invention to provide improved memory management in distributed computing systems.

It is yet another object of the present invention to provide a method, system, and program product for improving memory page sharing in a distributed computing environment.

The foregoing objects are achieved as is now described. The preferred embodiment provides a method, system, and computer program product for reducing false sharing in a distributed computing environment, and in particular to a multi-processor data processing system. A method is proposed to define a virtual address range, within the system memory available to the processors, which will have a finer granularity than the hardware page size. These smaller sections, called "sub-pages," allow more efficient memory management. For example, a 64 Kilobyte range may be defined by the memory management software to have a 512 byte granularity rather than 4 Kilobytes, with each 512-byte sub-page capable of being separately managed.

The above as well as additional objectives, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a memory block in accordance with a preferred embodiment of the present invention; and FIG. 4 is a memory block with sub-pages and a corresponding data structure, in accordance with a preferred embodiment of the present invention.

DETAILED DESCRIPTION OF THE PREFERRED EMBODIMENT

Figure 1:
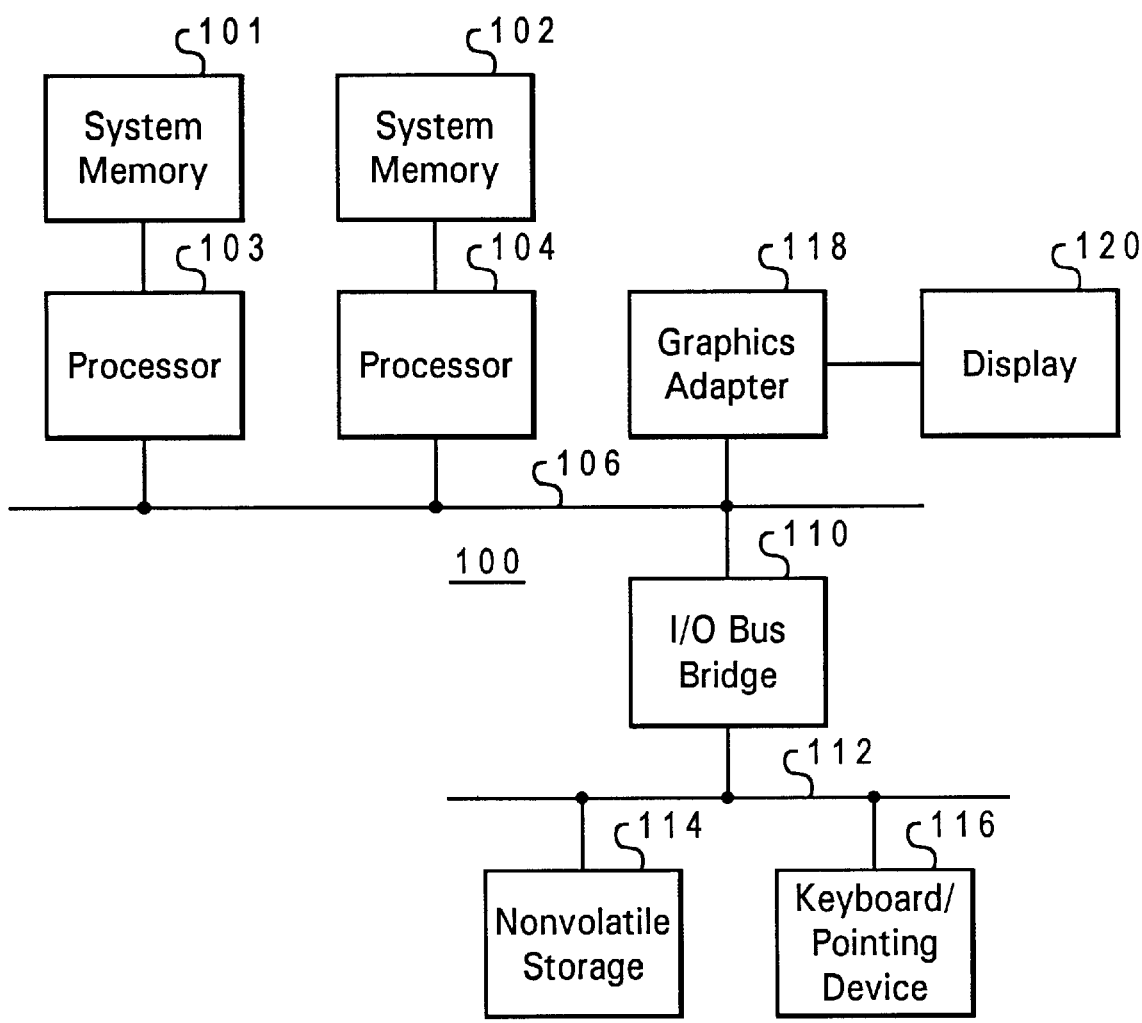
FIG. 1 depicts a block diagram of a multiprocessor system in accordance with a preferred embodiment of the present invention.

With reference now to the figures, and in particular with reference to FIG. 1, a block diagram of a data processing system in which a preferred embodiment of the present invention may be implemented is depicted. Data processing system 100 includes processors 103 and 104, which in the exemplary embodiment are each connected to a respective system memory 101 and 102, respectively, which are connected in turn to a system bus 106. While this exemplary diagram shows a dual processor system, the innovative techniques described below may be implemented in systems with any number of processors.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary partitioned computer systems below are provided solely as examples for the purposes of explanation and are not intended to imply architectural limitations.

This invention describes a method, system, and computer program product for reducing false sharing in a distributed computing environment. A method is proposed to define a virtual address range which will have a finer granularity than the hardware page size. These smaller sections, called "sub-pages," allow more efficient memory management. For example, a 64 Kilobyte range may be defined by the memory management software to have a 512 byte granularity rather than 4 Kilobytes, with each 512-byte sub-page capable of being separately managed.

In conventional x86-type processors, among others, when paging is enabled the linear address is mapped using an entry in the page directory and an entry in one of the page tables currently present in the system. The page directory and page tables are structures created in the linear address space.

The operating system maintains a single page directory for the entire system; the entries contained within the page directory are unique for each process in the system, and are copied into the page directory by the operating system when a task switch occurs. The page directory entries contain pointers to the page tables, which in turn point to the memory pages (both shared and private) belonging to the current process and processor.

The page directory and each page table are typically defined to be 1 page(4 KB) in size, and are aligned on 4 KB page boundaries. Since each page is 4 KB in size, this means a single page table gives access to 4 MB of memory.

The processor maintains a cache buffer for page table entries, known as the translation lookaside buffer (TLB). The TLB satisfies most access requests for page tables, avoiding the necessity to access system memory for paging information.

For each page frame, a bit in the page table entry known as the present bit indicates whether the address in that page table entry maps to a page in physical memory. When the present bit is set, the page is in memory and accessible. When the present bit is clear, the page is either not in memory, or is in memory but not directly accessible. When the present bit is clear in either the page directory or in the page table, a page fault is generated if an attempt is made to use a page table entry for address translation.

Pages are classified as one of the following types. "Fixed" pages are pages that are permanently resident in storage. They may not be moved or swapped out to secondary storage. "Swappable" pages are pages which can be swapped to disk when there is a shortage of physical memory. "Discardable" pages can be reloaded from either an EXE or a DLL file. When memory becomes overcommitted, space used for discardable pages can be freed up, and when the pages are required again they are loaded from the original file. "Invalid" pages are pages that have been allocated but not committed.

A virtual page structure (VP), in a conventional system, is allocated whenever a page is committed in response to an application request. No physical memory is allocated for the page at this time. The page table entry (PTE) is updated to point to the VP but the present bit in the page table is not set. When the page is first referenced, a page fault occurs. The allocation of physical memory is left to the last possible moment.

The virtual page structure describes the current disposition of a page. When a page fault occurs, the virtual memory manager obtains the address of the VP from the page table entry, and uses the information held in the VP to determine the required action which must be taken to resolve the page fault.

A page frame (PF) exists for each page of physical memory in the system. Page frames are stored in an array, which is indexed by the physical frame number within the system.

A page frame may have one of three states. A "Free" frame is available for allocation to a process in the system. An "In-use" frame has been allocated to the current process in the system. An "Idle" frame has been allocated to a process, but no page table entries for the current process reference this frame. This lack of reference normally indicates that the process, which is using the page, has been switched out; that is, the process is not the current process.

When the system is overcommitted, the number of free and idle page frames begin to fall. When it reaches a threshold level, pages are migrated from the in-use state to the idle state by a page ager. The page ager looks for pages that have not been accessed since the last time the page ager ran. The ager examines the accessed bit in the PTE. If clear, it marks the page not present. If a page is referenced by more than one PTE, a shared page, all PTEs must be marked not present before the page is placed on the idle list. The idle list is also a doubly linked list and least recently used (LRU) entries are at one end of the list and most recently used (MRU) entries are at the other end of the list.

Pages are also classified as dirty or clean. A dirty page is one that has been written to and must have its contents swapped to disk before it can be allocated to another proces. A clean page does not need to be swapped out, since it typically contains code or read-only data, which can be reloaded from the original file on disk. It could also be that a copy of the page currently exists in the swap file.

Placing a page frame on the idle list does not destroy its contents. The page frame is only reused when the operating system is forced to steal a page frame from the idle list in order to accommodate the loading of a page after a page fault. The swapping of an idle swappable page to disk is also usually delayed until there is a need to reuse the page frame to satisfy a page fault. To take advantage of the capability of certain I/O adapters to chain operations, other pages on the idle list may be swapped out at the same time.

When a process attempts to access a page, for which the present bit in the PTE is not set, a page fault occurs. According to the preferred embodiment, page faults on memory pages not broken into sub-pages are handled in a conventional manner. When a processor accesses an address in the range of address which has been allocated to sub-pages, the process changes, as described below.

The memory manager can be configured for the memory address range and granularity size in several ways within the ability of one of ordinary skill in the art. According to the preferred embodiment, the memory sub-page configuration is specified by the programmer/application through an Application Program Interface (API). Other possible ways include using static, predefined values, using standard configuration settings, specifying the configuration in an application by the compiler or linker, or allowing the memory manager to dynamically determine the configuration based on historical address trends.

Figure 2:
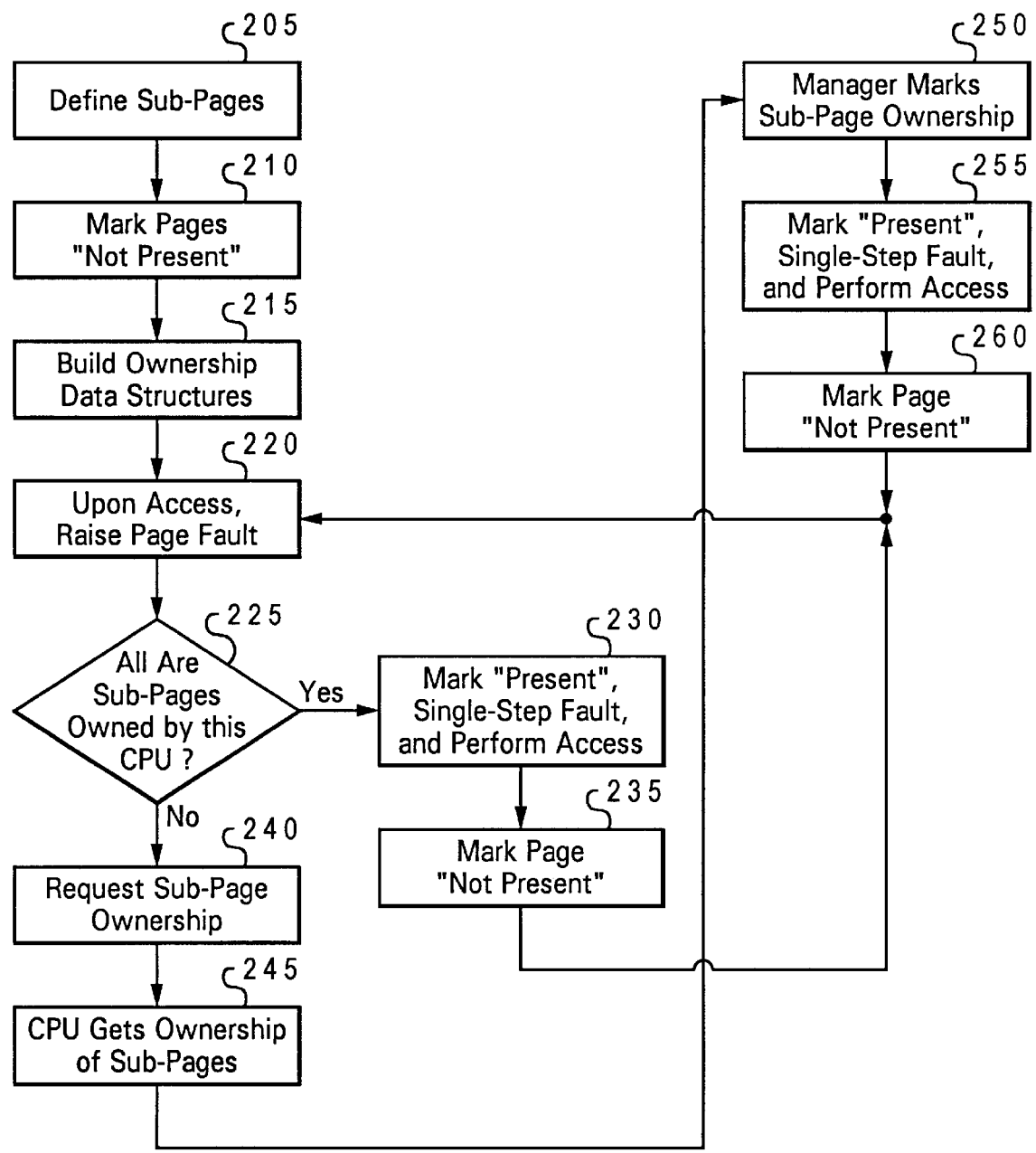
FIG. 2 is a flowchart of a process in accordance with a preferred embodiment of the present invention.

With reference to the flowchart shown in FIG. 2, and according to the preferred embodiment, the memory manager will first select the range of addresses to be broken into sub-pages (step 205). The preferred embodiment provides that the size of this range is arbitrary, as is the selected size of each of the sub-pages, but the range should break on page boundaries. If the range does not break on a page boundary, the memory manager can round the range to a page boundary, with the added space being unused. It should be noted that if a memory access does not refer to a sub-page range of the memory, it is handled in a conventional manner, and is not addressed in this flowchart.

The memory manager will next mark each of pages in the range of sub-pages as "Not Present" (step 210). For each sub-page that is accessible to a particular CPU, the pages will be placed on a special list in that CPU, similar to the idle-list described above (step 215). The CPU ownership information is stored in data structures associated with each sub-page.

Thereafter, when a given CPU attempts to access a sub-page in this range, the memory system will raise a page fault since all pages are marked "Not Present" (step 220). The memory management software will receive the page fault. When this page is actually present and reserved by that CPU, it is called a "Soft Fault".

If a soft fault occurs on a given sub-page and this CPU owns all of the sub-pages referenced by the faulting instruction (step 225), then the page is marked present and the faulting instruction is single-stepped (step 230). It should be noted that all memory accessed by the faulting instruction must be contained in sub-pages reserved by this CPU. After that CPU has finished executing the instruction which access the sub-page, the page is again marked not-present (step 235). The memory manager then exits the page fault handler. The program which accessed the memory address within the sub-page resumes normal operation at the next instruction (step 220).

If a soft fault occurs on a sub-page, and this CPU has not reserved all of the sub-pages referenced by the faulting instruction (step 225), the faulting CPU sends a message to the owning CPU to request ownership and the contents of the sub-page or sub-pages (step 240). Once the faulting CPU gains ownership and the contents of any required sub-page (step 245), the memory manager will indicate the sub-page is owned by the CPU by modifying the data structure associated with the sub-page (step 250). That page is then marked present and the faulting instruction is single-stepped (step 255). Note, again, that all memory accessed by the faulting instruction must be contained in sub-pages reserved by this CPU. After the access is complete, the page is again marked not-present (step 260). The memory manager then waits for the next access request (step 220).

Other functions of the sub-page structures behave as conventional memory systems do with regard to memory reservation and release functions, with each processor maintaining a data structure indicating page and sub-page ownerships. For example, if a first processor owns a given sub-page, and another processor requests that sub-page, the first processor will modify the data structure associated with that sub-page to indicate another CPU has ownership of the sub-page, and send the sub-page to the second processor. The second processor will then broadcast a message to all other processors indicating the ownership change, according to the preferred embodiment, and the other processors will update their data structures accordingly. Alternately, the first processor could broadcast the change-in-ownership message.

FIG. 3 shows a memory block 300 in accordance with the preferred embodiment. In this figure, it may be seen that block 300 is broken into 4 Kb sub-pages. Memory block 300 is an entire page as defined in hardware, e.g., a 64 K page. Each of these sub-pages may be separately owned; for example, sub-page 310 is shown as owned by CPU A, while sub-page 320 is owned by another processor, and not immediately accessible to CPU A.

FIG. 4 shows a memory block 400 and an associated data structure 410. Here, memory block 400 consists of multiple 4 Kb pages, while pages 402/404/406/408 are broken into sixteen 1 Kb sub-pages. The data structure 410 maintains information about each of these 1 Kb sub-pages; each 4 KB page being broken into four 1 Kb sub-pages. In this example, data structure entries 412/414/416/418 would contain ownership and other information related to the four 1 KB sub-pages of memory page 402.

This system, method, and program product reduces false sharing of data. This invention would most benefit an application that uses small discrete sections of memory but must currently reserve the whole physical page size. An example of this is locks on java vectors. Currently the entire physical page of memory must be reserved to access one java vector lock. This could be reduced significantly and allow faster more efficient access to java vectors. Another component that would benefit is network traffic. Network traffic is reduced because the size of the data being transferred is smaller. Network traffic is further reduced because a CPU does not have to reclaim a page if it is using the first section frequently and a second CPU is using the section frequently, where in conventional systems, the page would have "bounced" back and forth between the CPUs.

In summary, the reduction in false sharing achieved by this patent provides the following benefits:

More efficient management of memory resources can be achieve.

Memory/Cache will be better utilized because of smaller granularity, (more specifically, a ½ page of waste per page on average, smaller page size equals less waste).

Less information will be transmitted due to smaller "page-size".

Transmission latency is reduced because smaller "pages" are sent (reaches the end faster).

Network bandwidth is improved because smaller "pages" of data are sent (less data on the wire).

Network bandwidth is improved because data is sent less frequently.

In addition, in a loosely-coupled heterogeneous server environment, a common restriction is that all servers must have the same machine page-size. The method described in this patent could be used in a heterogeneous server environment to remove that restriction, and allow interoperability between machines with different machine page-sizes.

Applications which would benefit from this invention include both java and distributed applications which run on distributed or clustered systems. The biggest benefit would be seen by applications which operate sparsely on the data, not those which start at the beginning and sequentially read through the data. Examples of applications and environments which would benefit from this invention include:

Heterogeneous server environment.

Java Vector locks.

Air Traffic Control.

Calculation of movement of astrological bodies, including planets, satellites, etc.

Large databases such as Payroll or Inventory/sales.

Global Positioning Systems, including defense systems.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for managing memory in a data processing system, comprising the steps of:

dividing at least one hardware-defined page of memory in a data processing system into multiple software-defined sub-pages;

defining a data structure having an entry for each of the sub-pages, the data structures containing status information for each sub-page;

marking, in each respective data structure, each page containing a sub-page as inaccessible;

thereafter, when an access request for a first sub-page is received from a processor, if the data structure corresponding to the first sub-page indicates that the first sub-page is not owned by the processor, then obtaining ownership of the first sub-page;

marking, in the data structure, the page containing the first sub-page as accessible;

executing the access request on the first sub-page; and marking, in the data structure, the page containing the first sub-page as inaccessible.

2. The method of claim 1, wherein if an access request references more than one sub-page, then all sub-pages referenced by the access request must be owned by the processor.

3. The method of claim 1, wherein the status information includes accessibility information.

4. The method of claim 1, wherein the status information includes ownership information.

5. The method of claim 1, wherein the data processing system has at least two processors.

6. The method of claim 1, wherein the data structures are maintained by a memory management subsystem.

7. The method of claim 1, wherein the size of the memory page is at least four times the size of each sub-page.

8. The method of claim 1, wherein data stored in each sub-page is independently shared by each of a plurality of processors.

9. A computer system having at least a processor, a memory, and an accessible display, the computer system comprising:

means for dividing at least one hardware-defined page of the memory into multiple software-defined sub-pages;

means for defining a data structure having an entry for each of the sub-pages, the data structures containing status information for each sub-page;

means for marking, in each respective data structure, each page containing a sub-page as inaccessible;

means for thereafter, when an access request for a first sub-page is received from a processor, if the data structure corresponding to the first sub-page indicates that the first sub-page is not owned by the processor, then obtaining ownership of the first sub-page;

means for marking, in the data structure, the page containing the first sub-page as accessible;

means for executing the access request on the first sub-page; and means for marking, in the data structure, the page containing the first sub-page as inaccessible.

10. The computer system of claim 9, wherein if an access request references more than one sub-page, then all sub-pages referenced by the access request must be owned by the processor.

11. The computer system of claim 9, wherein the status information includes accessibility information.

12. The computer system of claim 9, wherein the status information includes ownership information.

13. The computer system of claim 9, wherein the data processing system has at least two processors.

14. The computer system of claim 9, wherein the data structures are maintained by a memory management subsystem.

15. The computer system of claim 9, wherein the size of the memory page is at least four times the size of each sub-page.

16. The computer system of claim 9, wherein data stored in each sub-page is independently shared by each of a plurality of processors.

17. A computer program product having computer readable program code on a computer usable medium, comprising:

instructions for dividing at least one hardware-defined page of memory in a data processing system into multiple software-defined sub-pages;

instructions for defining a data structure having an entry for each of the sub-pages, the data structures containing status information for each sub-page;

instructions for marking, in each respective data structure, each page containing a sub-page as inaccessible;

instructions for, thereafter, when an access request for a first sub-page is received from a processor, if the data structure corresponding to the first sub-page indicates that the first sub-page is not owned by the processor, then obtaining ownership of the first sub-page;

instructions for marking, in the data structure, the page containing the first sub-page as accessible;

instructions for executing the access request on the first sub-page; and instructions for marking, in the data structure, the page containing first sub-page as inaccessible.

18. The computer program product of claim 17, wherein if an access request references more than one sub-page, then all sub-pages referenced by the access request must be owned by the processor.

19. The computer program product of claim 17, wherein the status information includes accessibility information.

20. The computer program product of claim 17, wherein the status information includes ownership information.

21. The computer program product of claim 17, wherein the data processing system has at least two processors.

22. The computer program product of claim 17, wherein the data structures are maintained by a memory management subsystem.

23. The computer program product of claim 17, wherein the size of the memory page is at least four times the size of each sub-page.

24. The computer program product of claim 17, wherein data stored in each sub-page is independently shared by each of a plurality of processors.

25. A method for managing memory accessible by a plurality of processors, comprising:

dividing a range of memory addresses into a plurality of sub-pages wherein a size of each sub-page is different from a default page size of at least one of the processors;

marking each page containing sub-pages as inaccessible;

maintaining a data structure indicating processor ownership of each sub-page;

thereafter, when an access request for a first sub-page is received from one of the plurality of processors, determining if the first sub-page is owned by the requesting processor; and marking, responsive to the determination that the first sub-page is owned by the requesting processor, a page containing the first sub-page as accessible.

26. The method of claim 25, further comprising:

enabling a granularity of the sub-page size to be arbitrarily specified.

27. A system having means for managing memory accessible by a plurality of processors, comprising:

means for dividing a range of memory addresses into a plurality of sub-pages wherein a size of each sub-page is different from a default page size of at least one of the processors;

means for marking each page containing sub-pages as inaccessible;

means for maintaining a data structure indicating processor ownership of each sub-page;

thereafter, when an access request for a first sub-page is received from one of the plurality of processors, means for determining if the first sub-page is owned by the requesting processor; and means for marking, responsive to the determination that the first sub-page is owned by the requesting processor, a page containing the first sub-page as accessible.

28. The method of claim 27, further comprising:

means for enabling a granularity of the sub-page size to be arbitrarily specified.

\* \* \* \* \*